United States Patent
Mochizuki et al.

(10) Patent No.: US 7,251,046 B2
(45) Date of Patent: Jul. 31, 2007

(54) PRINT CONTROLLER OPERATION VERIFICATION SYSTEM

(75) Inventors: Akihito Mochizuki, Chiba (JP); Yukihiko Ogata, Saitama (JP); Isamu Ozawa, Kanagawa (JP); Masami Kato, Kanagawa (JP); Takeshi Shinomiya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1034 days.

(21) Appl. No.: 10/340,718

(22) Filed: Jan. 13, 2003

(65) Prior Publication Data

US 2003/0137683 A1 Jul. 24, 2003

(30) Foreign Application Priority Data

Jan. 22, 2002 (JP) ............................ 2002-013091

(51) Int. Cl.
*G06F 15/00* (2006.01)
*G06K 1/00* (2006.01)

(52) U.S. Cl. ................... 358/1.13; 358/1.14; 358/1.15; 399/82

(58) Field of Classification Search ............... 358/1.13, 358/1.14, 1.15; 399/82
See application file for complete search history.

(56) References Cited

U.S. PATENT DOCUMENTS

| | | | |
|---|---|---|---|
| 4,926,268 A | 5/1990 | Kawamura et al. | 358/458 |
| 5,142,568 A | 8/1992 | Ogata et al. | 379/100 |
| 5,369,505 A | 11/1994 | Wantanabe et al. | 358/444 |
| 6,727,999 B1 * | 4/2004 | Takahashi | 358/1.15 |
| 6,876,825 B2 * | 4/2005 | Kurahashi et al. | 399/82 |
| 6,912,059 B1 * | 6/2005 | Takahashi | 358/1.15 |
| 7,092,654 B2 * | 8/2006 | Kurahashi et al. | 399/82 |
| 7,119,920 B2 * | 10/2006 | Takahashi | 358/1.15 |
| 2002/0159086 A1 | 10/2002 | Shinomiya et al. | 358/1.13 |
| 2005/0219602 A1 * | 10/2005 | Mikami | 358/1.14 |

FOREIGN PATENT DOCUMENTS

| | | |
|---|---|---|
| JP | 62-188552 A | 8/1987 |
| JP | 3-87919 | 4/1991 |
| JP | 6-118140 | 4/1994 |
| JP | 9-277605 | 10/1997 |
| JP | 11-163724 | 6/1999 |
| JP | 2001-141794 | 5/2001 |
| JP | 2001-228215 | 8/2001 |
| JP | 2001-281301 | 10/2001 |
| JP | 2002-116893 | 4/2002 |
| JP | 2002-307791 A | 10/2002 |

\* cited by examiner

*Primary Examiner*—King Y. Poon
*Assistant Examiner*—Satwant Singh
(74) *Attorney, Agent, or Firm*—Fitzpatrick, Cella, Harper & Scinto

(57) ABSTRACT

In case of developing an image output apparatus including a controller to generate image data and an engine to form an image on a medium based on the image data, in order to verify the image data from the controller in real time, halftone image data before conversion into a PWM signal is converted into a serial signal and output instead of the PWM signal for output to the engine unit if a controller operation verification apparatus is used instead of the engine unit. Thus, multivalued halftone data not including an error due to a conversion process can be sent to the controller operation verification apparatus without adding signal line and driver circuit dedicated for sending the multivalued halftone data, whereby it is possible to improve development efficiency of the image output apparatus by accurate verification of the output image data.

12 Claims, 15 Drawing Sheets

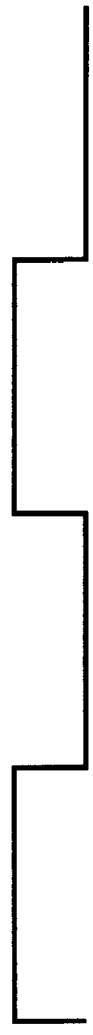
FIG. 13A  IMAGE CLOCK SIGNAL 108
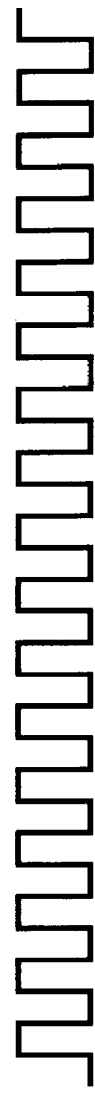
FIG. 13B  SYNC CLK SIGNAL 110 (n=8)
FIG. 13C  DIGITAL IMAGE DATA 101
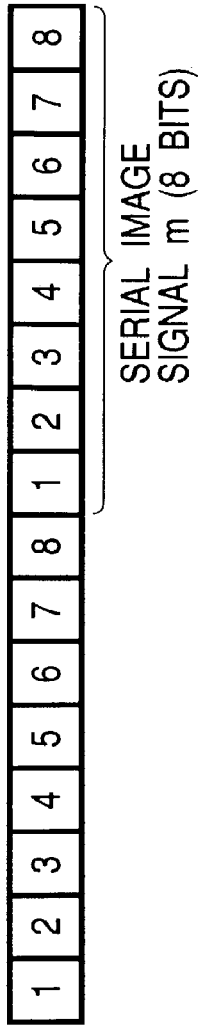
FIG. 13D  VIDEO OUTPUT SIGNAL 107

PRINT CONTROLLER OPERATION VERIFICATION SYSTEM

BACKGROUND OF THE INVENTION

1. Field of the Invention

The present invention relates to a controller operation verification system, an image processing apparatus, a controller operation verification apparatus, an image data output control method, an image data restoration method, a storage medium, and a program, and more particularly, to a controller operation verification system which verifies an operation of a controller constituting a printer in cooperation with an engine for outputting image data to a medium such as a paper or the like and is appropriately applied to a printer emulator supporting development of the printer, an image processing apparatus to which this system is applicable, a controller operation verification apparatus, an image data output control method, an image data restoration method, a storage medium, and a program.

2. Related Background Art

Conventionally, as shown in, e.g., FIG. 15, a printer 1500 which acts as an image output apparatus is connected to a host computer 1510 which includes a printer driver 1511, through a network, a USB (Universal Serial Bus) interface or the like. The printer 1500 includes a controller unit 1501 which converts intermediate output data generated from a print origin data by an apparatus such as the host computer 1510 or the like into output image data suitable for an output operation, and an engine unit 1502 which obtains the output image data output from the controller unit 1501 and outputs the data to form an image on a medium such as a paper or the like.

When an image is output by a laser beam printer which acts as an example of the printer, the intermediate output data suitable for the controller unit 1501 of the printer 1500 is generated by equipment such as the host computer 1510 or the like in accordance with software generally called the printer driver 1511. Then, the intermediate output image data is input to the controller unit 1501 of the printer 1500 through a network line such was a parallel line, a USB, Ethernet™ or the like. In the controller unit 1501, the intermediate output data is converted into the output image data suitable for the engine unit 1502, and the converted data is output as a video signal to the engine unit 1502 in sync with an image transfer permission signal supplied from the engine unit 1502. Then, in the engine unit 1502, an electrophotographic process for the video signal is controlled and driven, whereby the input video signal is output as the image on the medium such as the paper or the like. Here, it should be noted that output timing of the image transfer permission signal from the engine unit 1502 is determined on the basis of a paper transportation status, an electrophotographic process status and the like. Moreover, a general color conversion process or the like is performed by either the printer driver 1511 or the controller unit 1501.

Next, the above conversion process to convert the intermediate output data into the output image data suitable for the engine unit 1502 will be explained in detail. Japanese Patent Application Laid-Open No. 62-188552 discloses a method of achieving a gradation process suitable for a halftone output characteristic of an image forming apparatus acting as an output apparatus by converting halftone-processed digital image data into an analog signal according to pulse-width modulation. In recent years, such a process to convert the halftone data into the analog signal is widely adopted as a means for obtaining a high-definition image at high speed, according as printers of high image quality are being developed.

Incidentally, the controller unit 1501 and the engine unit 1502 are connected with each other by a communication path called a video interface. This video interface includes a video signal for transferring the above output image data, a control signal for controlling timing of the video signal and the like, a command signal for causing the controller unit 1501 to issue instructions to the engine unit 1502, a status signal for causing the engine unit 1502 to notify the controller unit 1501 of the status of the engine unit itself, an interrupt signal, and the like.

Here, the above paper transportation status indicates the status of paper within the engine unit while paper feeding, printing, paper discharging or the like is being performed, and the above electrophotographic process status indicates an idle status, an initialization status, an under-postprocess status or the like. The engine unit 1502 is not always in the printable status, that is, the engine unit 1502 outputs the image transfer permission signal to the controller unit 1501 only when it is in the printable status. The controller unit 1501 and the engine unit 1502 operate closely and cooperatively by using the control signal, the command signal and the status signal.

In conventional printer development and operation verification processes, the intermediate output data generated by a host computer is transmitted to the controller unit to actually operate the engine unit, whereby an output image (printed material) is obtained. Then, the operation of the printer is evaluated and verified by measuring the output time necessary to obtain the output image and directly and visually observing the output image and the obtained statuses. Moreover, the processes of generating the intermediate output data, outputting the data from the engine unit, measuring the output time, evaluating the output image, and verifying communication reasonability are repeatedly performed.

However, in the conventional technique that the output image is obtained to evaluate and verify it by actually operating the printer, the evaluation and verification can only be performed after the development of both the controller unit and the engine unit progresses enough and it arrives at the stage where both the controller unit and the engine unit actually operate. Under the circumstances, it is very difficult to shorten a development term and achieve parallel developments of these units. Moreover, since an amount of the printed materials to be used to evaluate the image and measure a print time becomes huge, there is a problem that, to prepare the printed materials, a long time is consumed and a large amount of consumable supplies and materials such as toner, print papers and the like are necessary.

To solve the above problem, Japanese Patent Application No. 2001-110529 which was filed previous to the present application by the applicant same as the assignee of the present application proposes an image processing apparatus which receives a video signal output from a controller unit and then visualizes the received signal as an image on a display such as a CRT or the like. That is, by using this image processing apparatus, in the printer development process, the video signal output from the controller unit can be visualized without using an engine unit to verify an output image, whereby consumable supplies and materials such as toner, print papers and the like can be saved, and various tests can be automatized. Moreover, since a controller operation can be verified without using the engine unit, development of the engine unit and development of the controller unit can be achieved separately in parallel, whereby development efficiency can be greatly improved.

However, there are following problems in the above previous Japanese application. That is, in the above image processing apparatus, the video signal output from the controller unit is usually converted into the analog signal according to the pulse-width modulation, whereby it is necessary to again convert the analog signal into the halftone digital image data so as to confirm the content of the analog signal in the former halftone representation. Otherwise, it is necessary to provide a means for externally capturing the signal before the digital data is converted into the analog signal and then sending the captured signal (digital data) to the image processing apparatus. In the former case, since a conversion error occurs when the analog signal is converted into the digital data, inconvenience occurs in the detailed verification operation for the output data. On the other hand, in the latter case, a dedicated signal line, a driver circuit and the like are necessary to send the multivalued halftone data, costs for the controller unit increase.

SUMMARY OF THE INVENTION

The present invention is made in consideration of the above conventional problems, and an object thereof is to provide a controller operation verification system which enables to improve development efficiency of an image output apparatus by accurate verification of output image data, an image processing apparatus to which this system is applicable, an image data output control method, a storage medium, or a program.

In order to achieve the above object, the present invention is characterized by a controller operation verification system which constitutes an image output apparatus in cooperation with an engine unit for forming an image on a medium on the basis of image data, and consists of a controller for generating the image data and a controller operation verification apparatus which verifies an operation of the controller, wherein the controller comprises: a first conversion means for converting halftone digital image data into a pulse-width modulation signal; a second conversion means for converting the halftone digital image data into a serial signal; and an output signal selection means for selecting the output signal of either the first conversion means or the second conversion means, and outputting the selected output signal, and the controller operation verification apparatus comprises: a data restoration means for restoring the output signal output from the second conversion means and selected by the output signal selection means to the halftone digital image data.

Moreover, the present invention is characterized by an image processing apparatus which constitutes an image output apparatus in cooperation with an engine unit for forming an image on a medium on the basis of image data, generates the image data, and can be connected with a controller operation verification apparatus, comprising: a first conversion means for converting halftone digital image data into a pulse-width modulation signal; a second conversion means for converting the halftone digital image data into a serial signal; and an output signal selection means for selecting the output signal of either the first conversion means or the second conversion means, and outputting the selected output signal.

Moreover, the present invention is characterized by an image data output control method which is applied to an image processing apparatus which constitutes an image output apparatus in cooperation with an engine unit for forming an image on a medium on the basis of image data, generates the image data, and can be connected with a controller operation verification apparatus, comprising: a first conversion step of converting halftone digital image data into a pulse-width modulation signal; a second conversion step of converting the halftone digital image data into a serial signal; and an output signal selection step of selecting the output signal in either the first conversion step or the second conversion step, and outputting the selected output signal.

Moreover, the present invention is characterized by a computer-readable storage medium which stores a program for executing an image data output control method which is applied to an image processing apparatus for constituting an image output apparatus in cooperation with an engine unit for forming an image on a medium on the basis of image data, generating the image data, and being able to be connected with a controller operation verification apparatus, the method comprising: a first conversion step of converting halftone digital image data into a pulse-width modulation signal; a second conversion step of converting the halftone digital image data into a serial signal; and an output signal selection step of selecting the output signal in either the first conversion step or the second conversion step, and outputting the selected output signal.

Moreover, the present invention is characterized by a program which is supplied to an image processing apparatus for constituting an image output apparatus in cooperation with an engine unit for forming an image on a medium on the basis of image data, generating the image data, and being able to be connected with a controller operation verification apparatus, comprising: a first conversion step of converting halftone digital image data into a pulse-width modulation signal; a second conversion step of converting the halftone digital image data into a serial signal; and an output signal selection step of selecting the output signal in either the first conversion step or the second conversion step, and outputting the selected output signal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrates embodiments of the invention and, together with the description, serve to explain the principles of the invention.

FIGS. 13A, 13B, 13C and 13D are timing charts of an image clock signal, a sync clock signal, digital image data and a video output signal of the image data output control unit in the printer controller shown in FIG. 1;

DETAILED DESCRIPTION OF THE PREFERRED EMBODIMENTS

The preferred embodiments of the present invention will now be described in detail in accordance with the accompanying drawings.

First Embodiment

Initially, an outline of the first embodiment of the present invention will be explained. In the present embodiment, in case of developing an image output apparatus composed of a controller unit for generating image data and an engine unit for forming an image on a paper medium on the basis of the image data, when a controller unit operation verification apparatus is used instead of the engine unit in order to verify the image data to be generated by the controller unit in real time, it becomes possible to transfer multivalued halftone data, which does not include difference due to a conversion process, to the controller unit operation verification apparatus without adding an exclusive signal line used for transferring the multivalued halftone data and a driver circuit by converting halftone image data before being converted into a PWM (pulse-width modulation) signal, which is different from a PWM signal to be output to the engine unit, into a serial signal and outputting the converted serial signal, whereby a developing efficiency of the image output apparatus according to accurate verification of output image data is improved.

Figure 1:
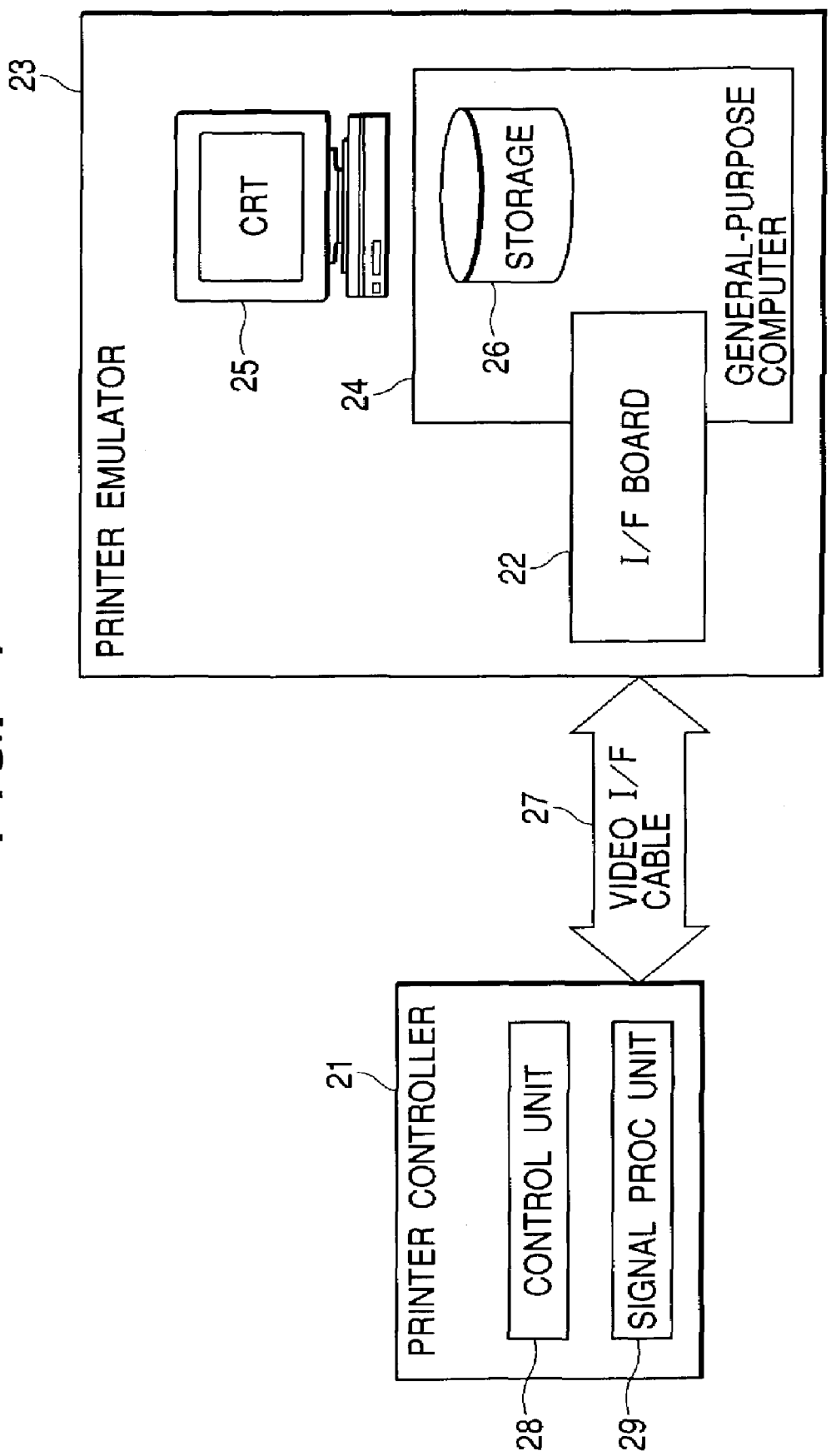
FIG. 1 is a block diagram showing the connecting structure of a printer emulator according to the embodiment of the present invention.

FIG. 1 is a block diagram showing an example of the connecting structure of a printer emulator according to the embodiment of the present invention. A printer emulator 23 has an interface unit (interface board) 22, a general-purpose computer 24 including a storage (storage device) 26 and a CRT 25 being a display means. It should be noted that the display means is not limited to the CRT, but may be a liquid crystal or the like. In FIG. 1, reference numeral 21 denotes a printer controller (controller unit) to which operation verification by the printer emulator 23 is executed and reference numeral 27 denotes a video interface cable.

More specifically, the printer controller 21 is connected to a personal computer or the like (in the present embodiment, the general-purpose computer 24 of the printer emulator 23) through a parallel interface, a USB interface or a network (not shown). The printer emulator 23 is connected to an output of the printer controller 21 through the video interface cable 27 and is composed of the general-purpose computer 24, which includes the interface unit (PCI (Peripheral Component Interconnect) board) 22, and the CRT 25. The general-purpose computer 24, which is composed of the storage 26 such as a hard disk or the like, a keyboard, a mouse, a CPU, a memory and the like (not shown), has a PCI bus being an expansion bus used for connecting to the interface unit 22.

The output of the printer controller 21 is fundamentally to be connected to an engine controller of a printer. For example, in a case of an electrophotographic system laser printer, the engine controller drives a laser driver and forms an image from raster image data generated by the printer controller as a static latent image on a surface of a photosensitive drum. Then, an image is developed on a recording paper by magnetically adhering toner on the static latent image.

On one hand, in case of executing the operation verification of the printer controller 21 by utilizing the printer emulator 23, the video interface cable 27 is connected to the interface unit 22 of the printer emulator 23.

The printer controller 21 (printer controller 100 in FIG. 2) being the feature of the present embodiment can detect if a connected-destination apparatus for the printer controller 21 is the engine controller or the printer emulator according to transmission/reception of previously defined command signal and status signal, and a changeover of an image signal output (described later) is performed on the basis of the detected result.

That is, the printer controller 21 (printer controller 100 in FIG. 2) obtains data through an external interface means and discriminates kinds of the connected-destination apparatus for the printer controller on the basis of the obtained data. The printer controller 21 has a control unit 28 for controlling an output selection signal 105 (described later in FIG. 12) on the basis of the discriminated result and a signal processing unit 29 (a multivalued halftone processing unit 102, a PWM conversion unit 103, a parallel/serial conversion unit 104, a line driver 106, a PLL (phase-locked loop) unit 109 and a line driver 111 shown in FIG. 12). The structure shown in FIG. 12 will be described in detail in the following.

The interface unit 22 generates sync signals (horizontal sync signal and vertical sync signal) in accordance with an output command of the printer controller 21, a status of the engine to be emulated or the like, obtains the raster image data to be output from the printer controller 21 and holds the obtained image data in a memory on the interface unit 22. The image data held in the memory is transferred to the general-purpose computer 24 and is displayed on the CRT 25. As mentioned above, the printer emulator 23 is connected to the printer controller 21 instead of a printer engine and is utilized in a development of hardware/software of the printer controller 21.

Figure 12:
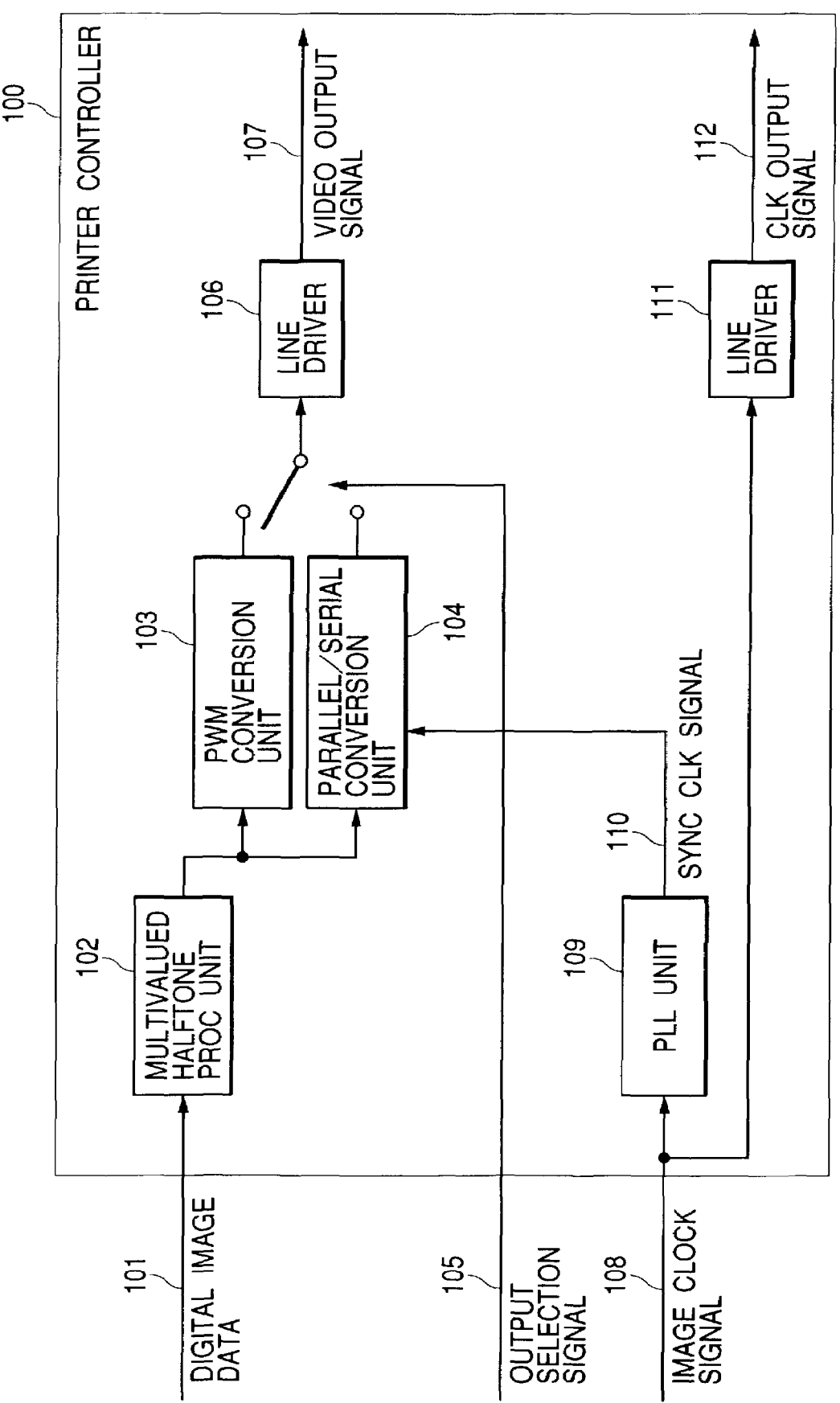
FIG. 12 is a block diagram showing the structure of an image data output control unit in a printer controller shown in FIG. 1.

FIG. 12 is a block diagram showing the structure of an image data output control unit in the printer controller (numeral 21 in FIG. 1 and numeral 100 in FIG. 2) being the feature of the present embodiment. The image data output control unit in the printer controller has the multivalued halftone processing unit 102, the PWM conversion unit 103, the parallel/serial conversion unit 104, the line driver 106, the PLL unit 109 and the line driver 111.

More specifically, digital image data 101 transmitted from a host computer (not shown) is converted into a format adjusted to printing in the multivalued halftone processing unit 102. The PWM conversion unit 103, which is a pulse-width modulation signal generating circuit, outputs an analog image signal (pulse-width modulated signal) adjusted to an input of the digital image data. An image clock signal 108, which is a clock signal synchronized with the digital image data 101, is input to the PLL unit 109. The PLL unit 109 gives a sync clock signal 110, which is obtained by multiplying frequency of the image clock signal 108 by n, to the parallel/serial conversion unit 104 in order to convert the digital image data into a serial signal. The symbol n corresponds to the bit width of the digital image data. For example, if the image data is expressed by 256-gradation (eight bits), the PLL unit 109 operates to adjust n to a status that n=8.

On one hand, the parallel/serial conversion unit 104 converts the input digital image data into the serial signal and outputs the converted signal. Outputs signals of the PWM conversion unit 103 and the parallel/serial conversion unit 104 are selectively output as a video output signal 107 in accordance with the output selection signal 105 through the line driver 106 composed of a driver/receiver device used for an equilibrium signal interface. The image clock signal 108 is output as a clock output signal 112 through the line driver 111.

FIGS. 13A to 13D are timing charts in a case where n is equal to eight (n=8). A waveform shown in FIG. 13A indicates the image clock signal 108, a waveform shown in FIG. 13B indicates the sync clock signal 110, a waveform shown in FIG. 13C indicates the digital image data 101 and a waveform shown in FIG. 13D indicates the video output signal 107. A portion indicated by reference numeral 1322 in the video output signal 107 is a serial image signal m (eight bits).

Since the output signal of the PWM conversion unit 103 is a signal of analog processed, it has not only the feature capable of obtaining a precise image at a high speed but also the case of easily influenced by dispersion of the device characteristic or voltage of the power source and an electrical noise. That is, it is difficult to restore the output signal of the PWM conversion unit to original halftone data. On one hand, since the output signal of the parallel/serial conversion unit 104 is a signal of digital processed, it is easy to restore that output signal to the halftone data.

The PWM conversion unit 103 may be, for example, a generally used dither circuit or the like if the image data can be converted into the halftone processed output image data. Moreover, a multivalued halftone process may not be executed in the printer controller 100 if it is such a system where the multivalued halftone process is executed in the printer driver of the host computer.

Figure 2:
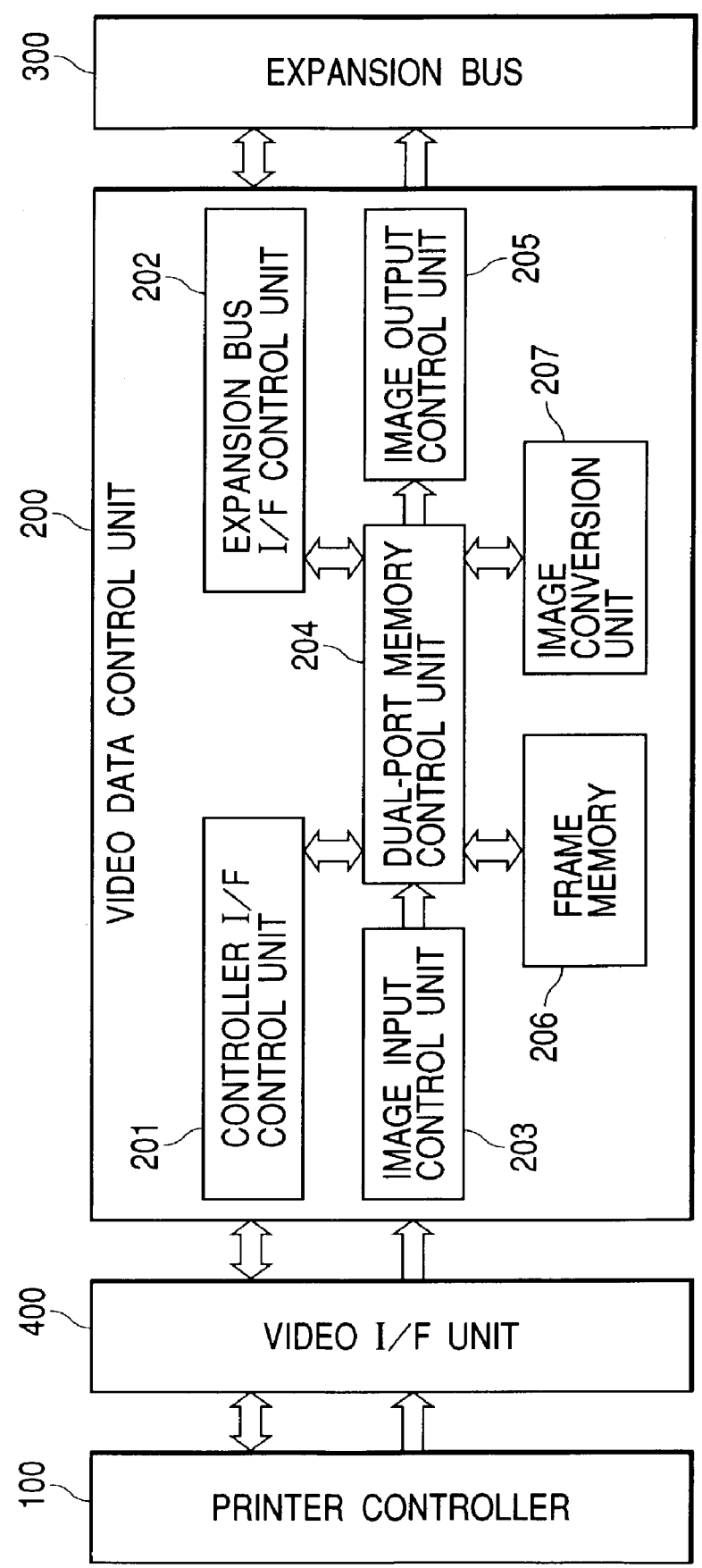
FIG. 2 is a block diagram showing the structure of an interface unit of the printer emulator shown in FIG. 1.

FIG. 2 is a block diagram showing the structure around the interface unit 22 of the printer emulator 23 shown in FIG. 1. The interface unit 22 is composed of a video interface unit 400 and a video data control unit 200. The video data control unit 200 is connected to the printer controller 100 (numeral 21 in FIG. 1) through the video interface unit 400 and is directly connected to an expansion bus 300 of the general-purpose computer 24 (personal computer). The video data control unit 200 includes an image input control unit 203, a dual-port memory control unit 204 and an image output control unit 205 which are mutually connected in series, a controller interface control unit 201, an expansion bus interface control unit 202, a frame memory 206 and an image conversion unit 207 which are connected to the dual-port memory control unit 204. In FIG. 2, numeral 300 denotes the expansion bus.

More specifically, the controller interface control unit 201 of the video data control unit 200 includes an interactive serial communication control unit which controls a reception of a printer command transmitted by the printer controller 100 and a transmission of an engine response to the printer command and further includes a port used for transmitting a status signal and a interrupt signal to the printer controller 100. The video data control unit 200 has the function of accumulating image data output from the printer controller 100 in the frame memory 206 and transferring the image data accumulated in the frame memory 206 to a processing unit of the general-purpose computer 24 through the expansion bus 300.

The controller interface control unit 201 issues an image transfer permission signal to an image transfer request signal sent from the printer controller 100, thereafter the printer controller 100 starts to transfer the image data. The image input control unit 203 transfers the image data output from the printer controller 100 to the dual-port memory control unit 204. Then, the dual-port memory control unit 204 writes the image data transferred from the image input control unit 203 into the frame memory 206. When the transference of the one-page image data output from the printer controller 100 is terminated, and the writing of the image data into the frame memory 206 is terminated, the expansion bus interface control unit 202 continuously starts to transfer the image data to a predetermined transfer destination (memory on PCI space) through the expansion bus 300.

Transference of the image data executed in this time is performed by the following procedure. That is, the image data held in the frame memory 206 is read and then a conversion process is executed to the image data by the image conversion unit 207, thereafter the image data is transferred to the image output control unit 205. The conversion process by the image conversion unit 207 is a reduction conversion process adjusted to displaying capacity of the CRT 25. In many cases, since the size of an image display area of the CRT 25 is small as compared with the size of the image data to be output by the printer controller 100, it is required to convert the image data into such data of which size is adapted to the size of the image display area of the CRT 25. Concretely, high quality image data, of which the number of main scanning pixels are 4,868 pixels and the number of sub-scanning lines are 6,848 lines or the like, accumulated in the frame memory 206 is multiplied by ⅛ to reduce the data size and then image data having the resolution of 608 pixels×856 lines is transferred to the general-purpose computer 24. In this case, in order to suppress the influence of folding noise or the like accompanied by the sub-sampling, a predetermined spatial filtering process is simultaneously executed, whereby quality of a displayed image can be improved.

By executing the above reduction conversion process by the image conversion unit 207, an amount of the data transference to the general-purpose computer 24 through the expansion bus 300 can be suppressed and the processing load by the software of the general-purpose computer 24 can be reduced. When the transference of the one-page image data to the general-purpose computer 24 is terminated according to the above procedure, the expansion bus interface control unit 202 notifies the termination by the interrupt signal.

Figure 3:
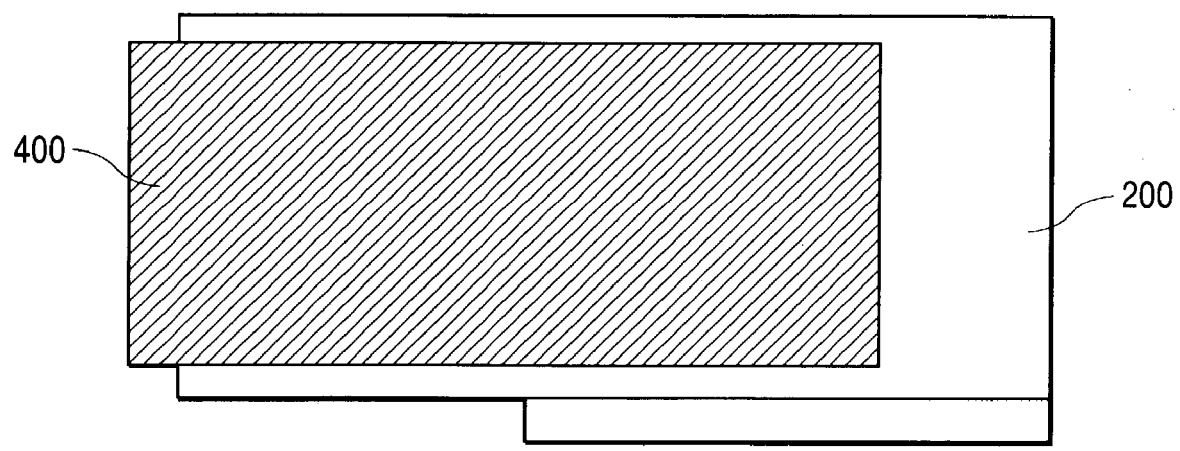
FIG. 3 is a view showing the physical shapes of a video interface unit and a video data control unit shown in FIG. 2.

FIG. 3 is a view for explaining physical shapes of the video interface unit 400 and the video data control unit 200 shown in FIG. 2. The video data control unit 200 is mounted on an expansion slot of the general-purpose computer 24 as an expansion board of a PCI interface. The video interface unit 400 is a unit to be detachably inserted in the video data control unit 200.

Figure 4:
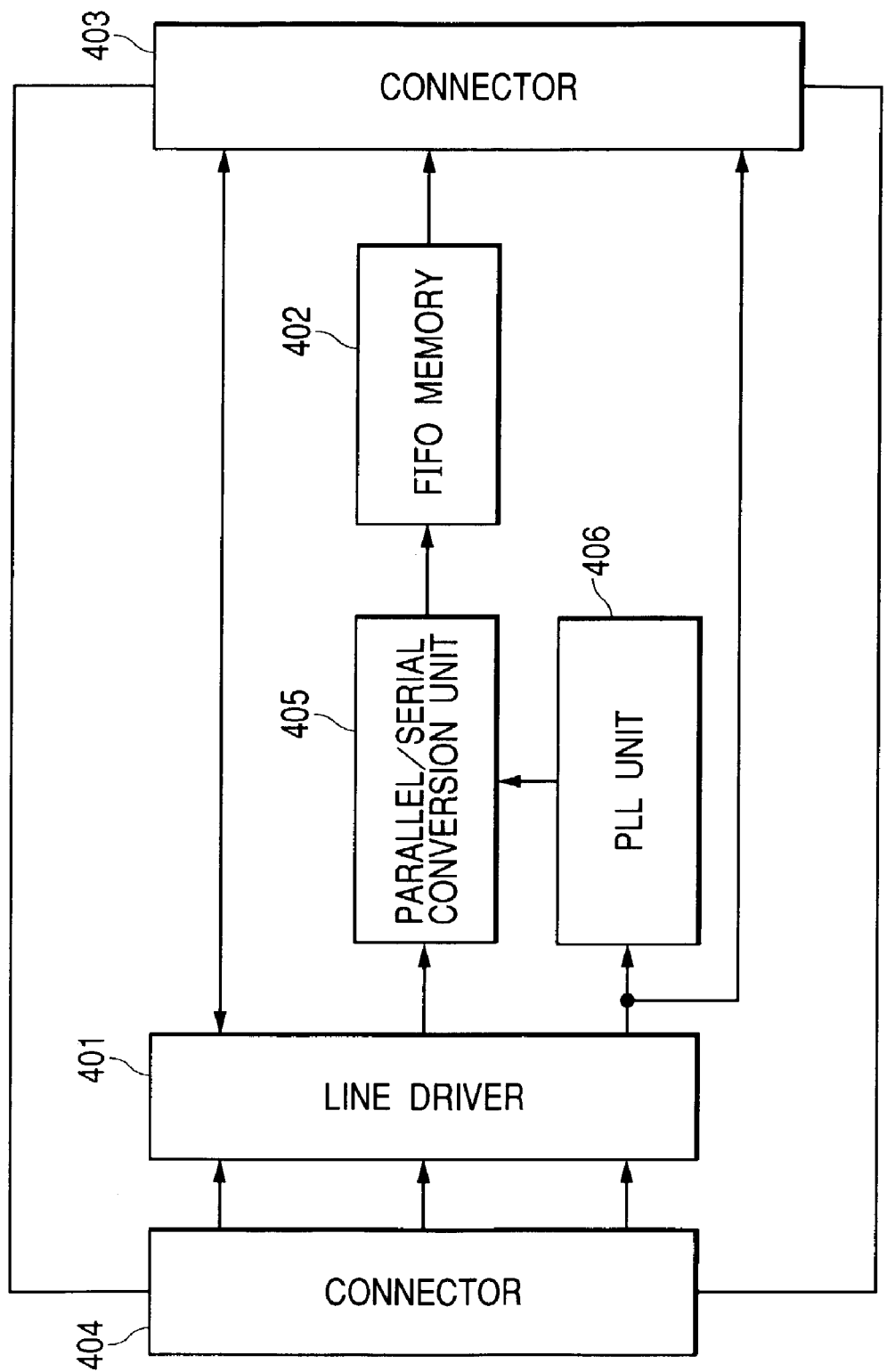
FIG. 4 is a block diagram showing the internal structure of the video interface unit shown in FIGS. 2 and 3.

FIG. 4 is a block diagram showing the internal structure of the video interface unit 400 shown in FIGS. 2 and 3. The video interface unit 400 has a connector 404, a line driver 401 connected to the connector 404, a serial/parallel conversion unit 405, a PLL unit 406, a FIFO (First-In, First-Out) memory 402 and an insertion connector 403, which is used for an inserting connection, connected through the FIFO memory 402.

More specifically, the line driver 401 is composed of a driver/receiver device used for an equilibrium signal interface for connecting a high speed serial video signal and a clock output signal through the video interface cable 27. With respect to the clock output signal, a sync clock signal, of which the frequency is multiplied by n by the PLL unit 406 similar to a case in the printer controller 100, is supplied to the serial/parallel conversion unit 405, whereby restored halftone image data is held in the FIFO memory 402. The connector 404 is connected to the printer controller 100 through an exclusive video cable, and various sync signals, C, M, Y and K image data synchronized with the sync signals, a serial command signal for controlling an interface with the printer engine, an interrupt signal, various control signals and the like are connected to the printer controller 100.

The connector 403 participates in a physical interface with the video data control unit 200, which generates the sync signals (horizontal sync signal and vertical sync signal) in accordance with the printer command sent from the printer controller 100, a status of engine to be emulated or the like and extracts the image data, which is sent from the printer controller 100 in accordance with the sync signals, from the FIFO memory 402.

Figure 5:
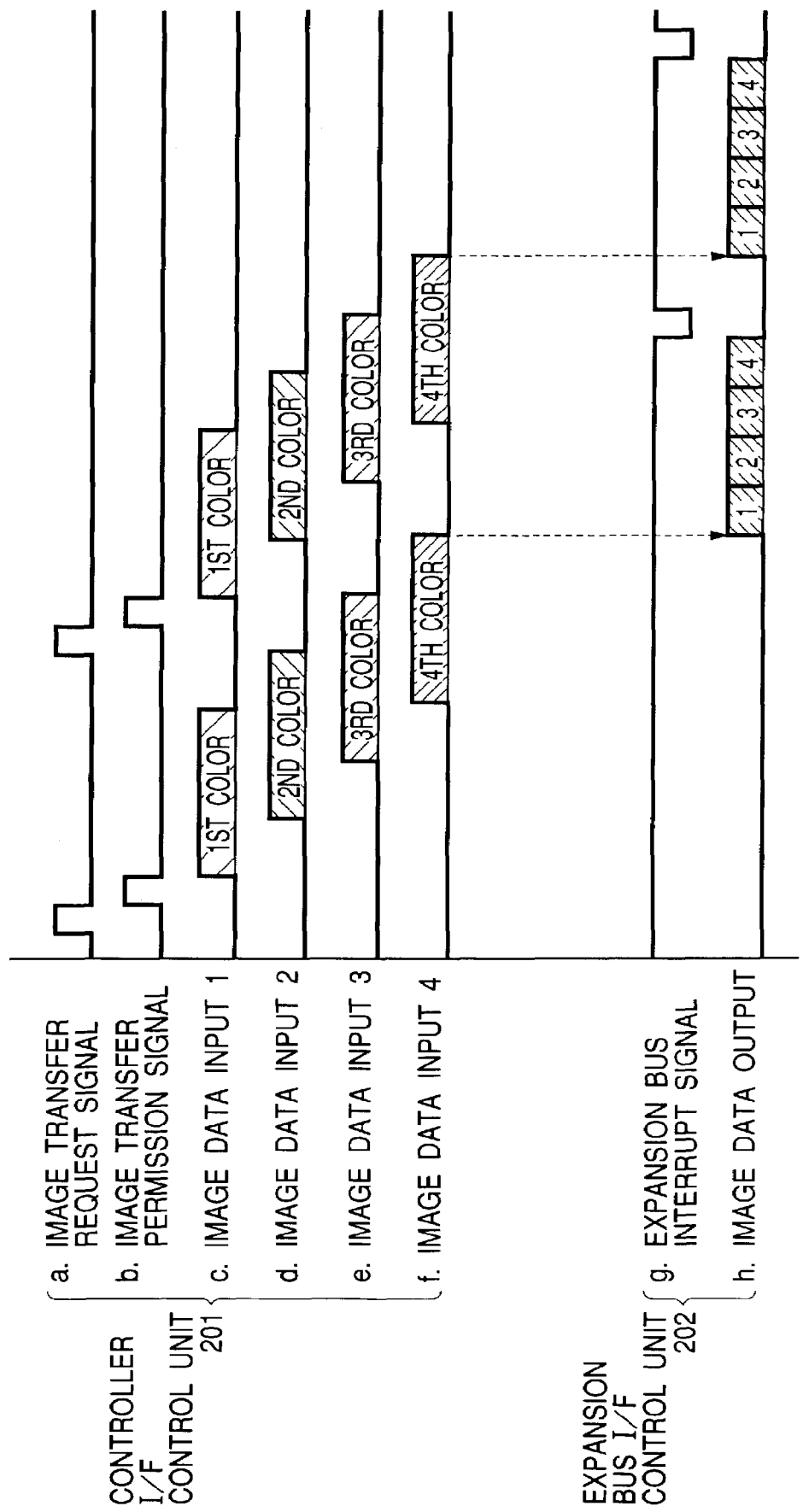
FIG. 5 is a timing chart showing an operation regarding image capture by the printer emulator shown in FIG. 1.

FIG. 5 is a timing chart showing an operation regarding image data capture by the printer emulator 23 shown in FIG. 1. The printer emulator 23 shown in FIG. 1 sequentially and simultaneously executes an image transfer process to four colors image data output from the printer controller 21 (printer controller 100 in FIG. 2). In FIG. 5, when an image transfer request signal a is issued from the printer controller 21, the controller interface control unit 201 sends back an image transfer permission signal b for the request. The printer controller 21, to which the image transfer permission signal b was sent back, transfers four image data c to f in accordance with a predetermined timing.

The image input control unit 203 stores the transferred image c to f in the frame memory 206 through the dual-port memory control unit 204 and then continuously starts to transfer image data to a predetermined memory which is managed by the software functioning on the general-purpose computer 24 when the transference of a first page image data input 4 is terminated. As indicated by an image data output h, data for one page held in the frame memory 206 is sequentially transferred every color, and when the transference is terminated, the expansion bus interface control unit 202 generates an expansion bus interrupt signal g and notifies termination of the transference of the first page image data to the system side (general-purpose computer 24).

With the above series of operations, the first page image data is transferred from the printer controller 100 to the expansion bus 300 through the video data control unit 200. A transference procedure of a second page image data is performed by the same procedure as that of the first page image data. As shown in FIG. 5, the transference of the second page image data from the printer controller 100 to the video data control unit 200 and the transference of the first page image data from the printer emulator 23 to the expansion bus 300 are simultaneously performed. The video data control unit 200 has memory capacity for two pages so as to perform a data output of the first page and a data input of the second page simultaneously.

In this manner, the printer emulator 23 emulates engine status in accordance with the printer command transmitted by the printer controller 100, generates an image sync signal at a predetermined timing in accordance with the engine status, captures the image data which is output from the printer controller 100 and displays an image on the CRT 25.

Figure 14:
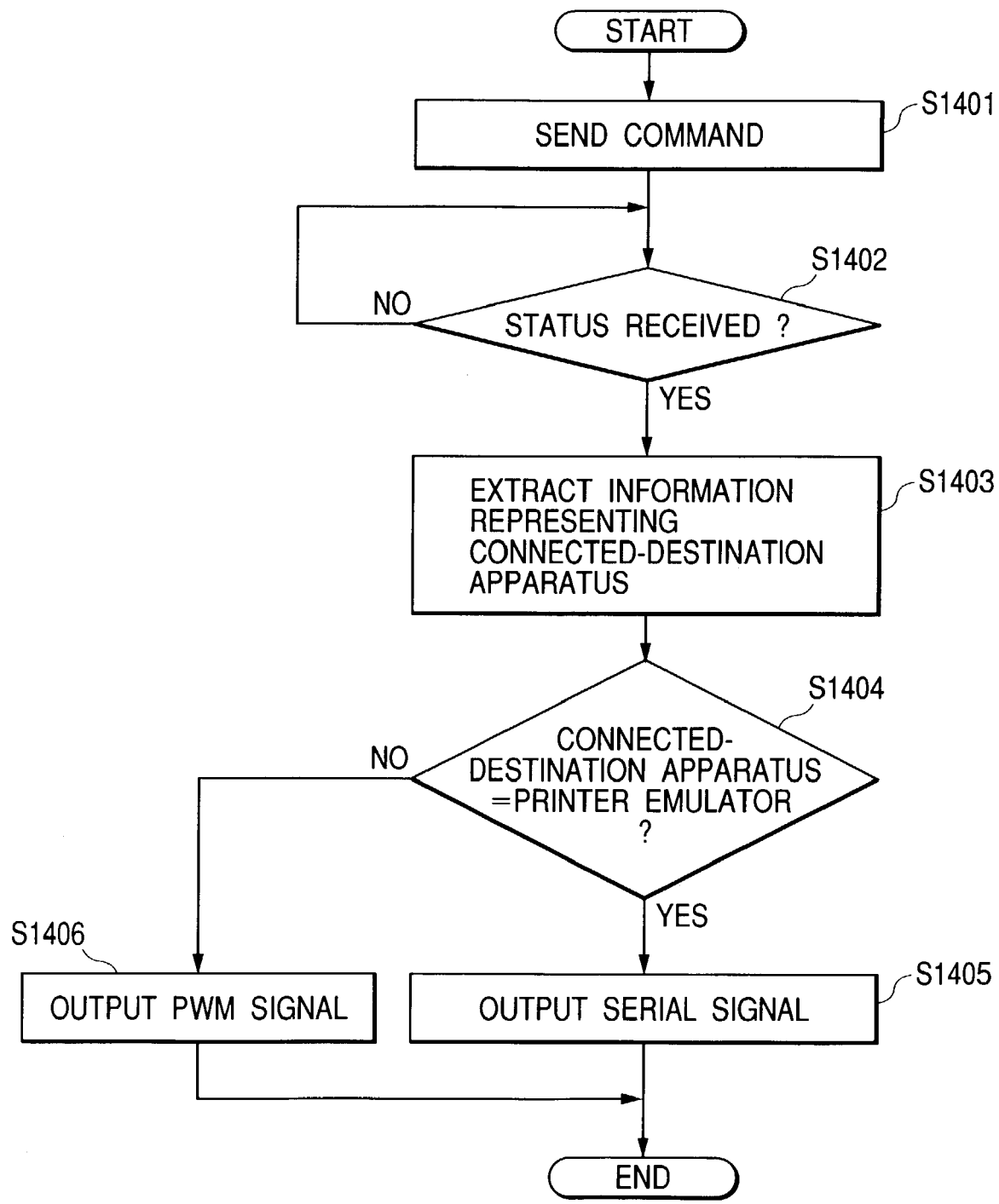
FIG. 14 is a flow chart showing a control procedure of the image data output control unit in the printer controller shown in FIG. 1.
Figure 15:
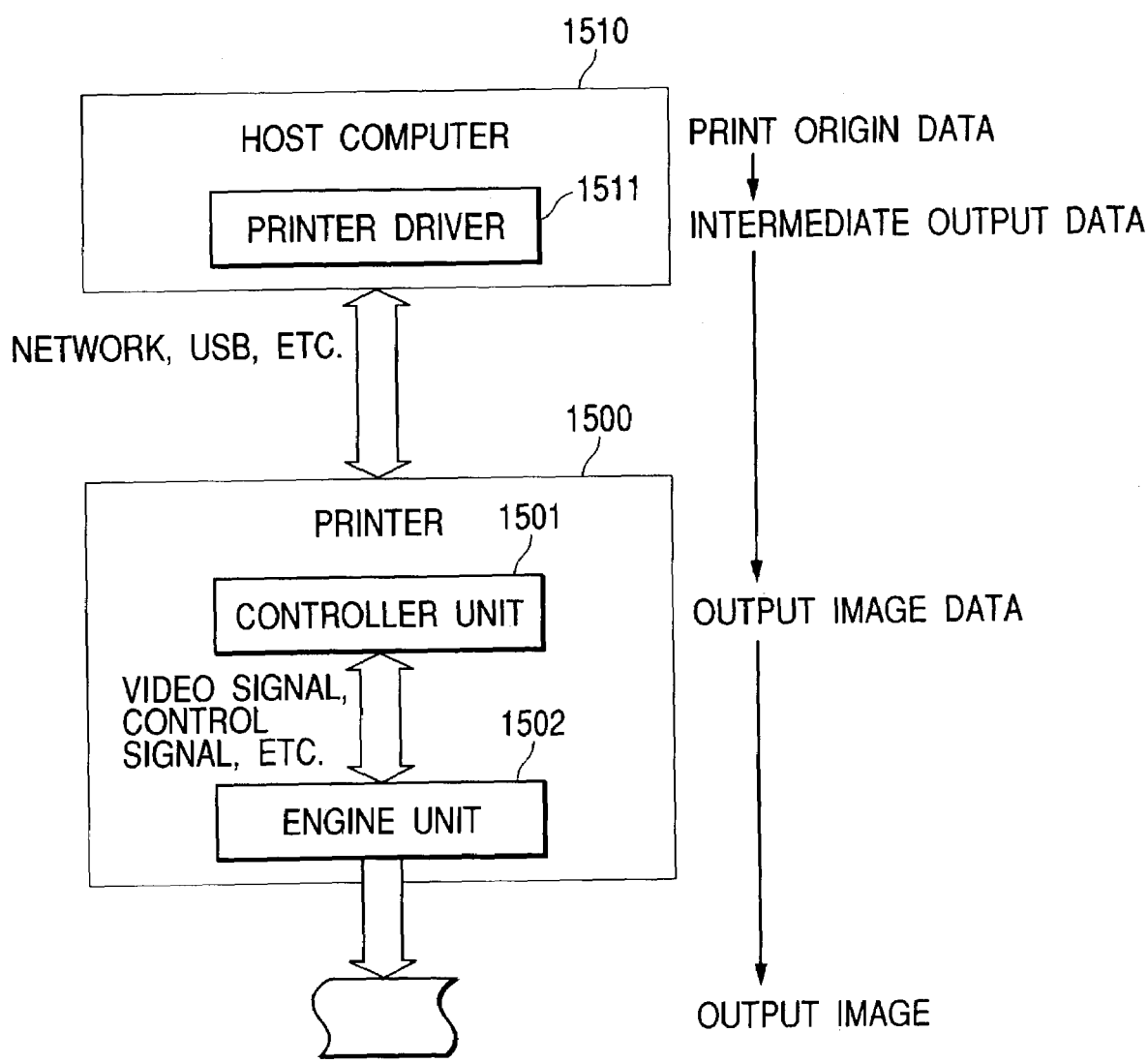
FIG. 15 is a view showing the structure of a printer system.

FIG. 14 is a flow chart showing a control flow of the image data output control unit in the printer controller (numeral 21 in FIG. 1 and numeral 100 in FIG. 2) being the feature of the present embodiment. The process in this flow chart is executed by the control unit 28 in the printer controller (numeral 21 in FIG. 1 and numeral 100 in FIG. 2) on the basis of the program stored in the interior of the printer controller or the program supplied from the exterior of the printer controller.

After executing an initialization process, the printer controller (numeral 21 in FIG. 1 and numeral 100 in FIG. 2) sends a command used for confirming a connected-destination apparatus through a serial command interface (step S1401) and waits for reception of status data to be sent back from the connected-destination apparatus (step S1402). Upon receiving the status data sent back from the connected-destination apparatus, information representing kinds of the connected-destination apparatus is extracted from the received status data (step S1403). It should be noted that the connected-destination apparatus is either the engine controller or the printer emulator.

Further, it is discriminated that the connected-destination apparatus for the printer controller is what kind of apparatus from the information representing kinds of the connected-destination apparatus extracted in the step S1403 (step S1404). In case of discriminating that the connected-destination apparatus for the printer controller is the printer emulator, a flow advances to a step S1405. That is, the output selection signal 105 is controlled so as to output an output signal of the parallel/serial conversion unit 104 as the video output signal 107 (step S1405). On the other hand, in case of discriminating that the connected-destination apparatus for the printer controller is the engine controller, the flow advances to a step S1406. That is, the output selection signal 105 is controlled so as to output an output signal of the PWM conversion unit 103 as the video output signal 107 (step S1406).

Figure 6:
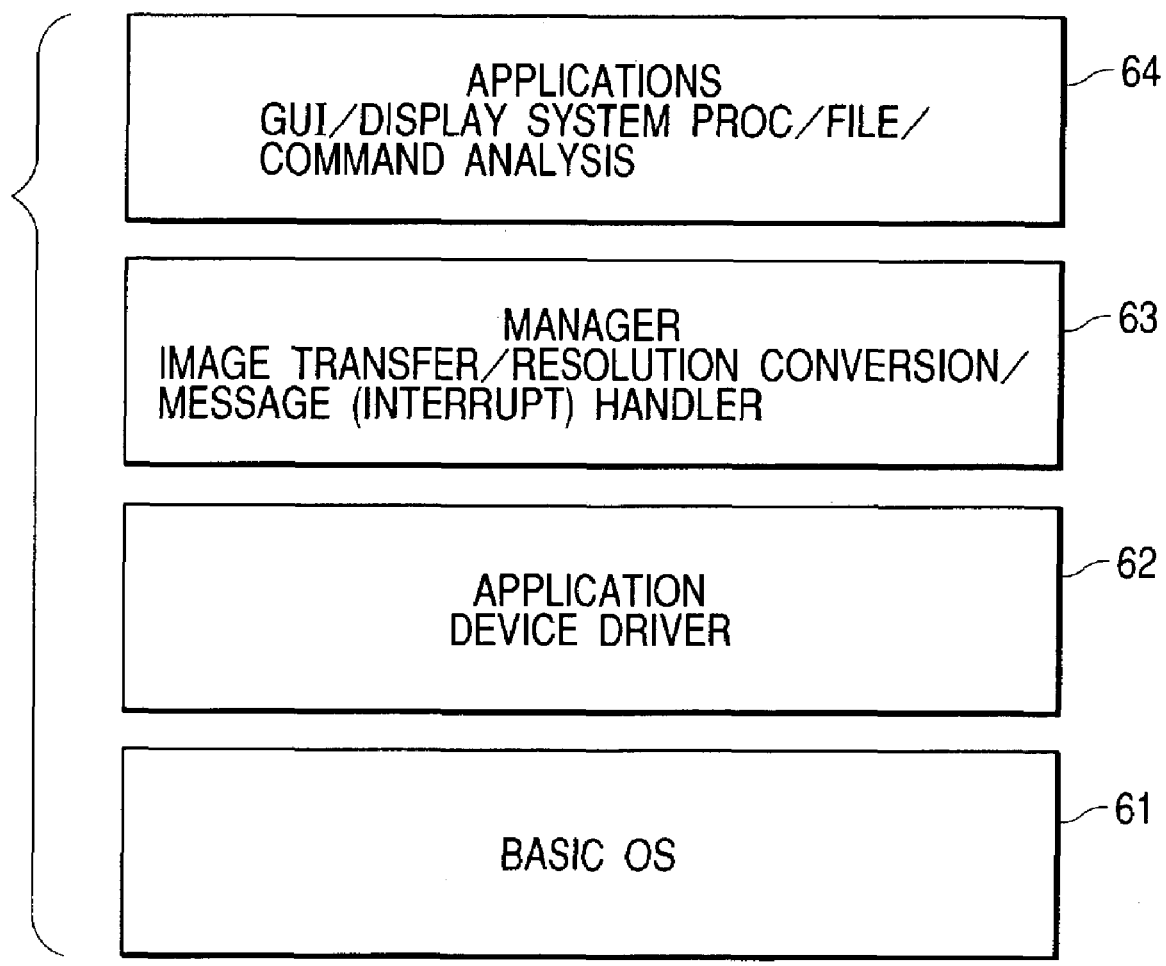
FIG. 6 is a view showing the structure of software functioning on a general-purpose computer of the printer emulator shown in FIG. 1.

Next, software (software operating on the general-purpose computer 24 being a host computer) executed by the printer emulator 23 will be explained. FIG. 6 is a view showing the structure of the software functioning on the general-purpose computer 24 of the printer emulator 23 shown in FIG. 1. The general-purpose computer 24 has an operating system (basic OS) 61, a driver 62, a manager 63 and applications 64. In the present embodiment, as the basic OS, Windows™ 2000 provided by Microsoft Corporation is used.

More specifically, the operating system 61 manages resources such as a memory, an interrupt, a hard disk and the like in the general-purpose computer 24. The driver 62 includes a device driver being software for providing basic operations for the interface unit 22 being the hardware necessary for the present embodiment. The basic operations are an access to a register on the interface unit 22, an interrupt process from the interface unit 22, an access to a buffer memory and the like.

The manager 63 is a middleware for providing a high-grade operation to the interface unit 22. The high-grade operation is such a function as obtaining the image data stored in the buffer memory, and when the image data is obtained, processes such as reduction, enlargement, a dither correction and the like can be simultaneously executed. In the manager 63, the device driver is utilized. The application 64 is software being a user interface for an operator of the printer emulator 23. The operator can issue instructions such as start, stop, reproduction and the like to the printer emulator 23 through the applications 64. In the applications 64, the middleware is utilized.

A distinctive control of the present invention in the printer emulator 23 is as follows. That is, the image data output from the printer controller 100 is obtained and stored in the frame memory 206 by the video data control unit 200, and the image data transferred from the frame memory 206 is stored in the storage 26 by the general-purpose computer 24. The general-purpose computer 24 performs a control of displaying the image data on the CRT 25 by selecting the image data from the frame memory 206 or the storage 26 in accordance with a continuous operating mode of selecting the image data from the frame memory 206 and displaying an image and an off-line mode of selecting the image data from the storage 26 and displaying the image. Selection of the continuous operating mode and the off-line mode is performed on a screen of the CRT 25.

The reduction conversion process adjusted to the displaying capacity of the CRT 25 is executed to the image data stored in the frame memory 206 by the image conversion unit 207 in the video data control unit 200, and the image data, to which the reduction conversion process was executed, is transferred to the storage 26 by the expansion bus interface control unit 202. The general-purpose computer 24 stores the plural obtained and transferred image data in the storage 26 on the basis of a series of communication controls, and when the off-line mode is selected by the operator, the plural image data (image data of plural pages) stored in the storage 26 are sequentially switched and displayed on the CRT 25 with a predetermined display interval.

Next, the operations performed in the printer emulator of the present embodiment structured as above will be explained in detail with reference to FIGS. 1 to 11.

Figure 7:
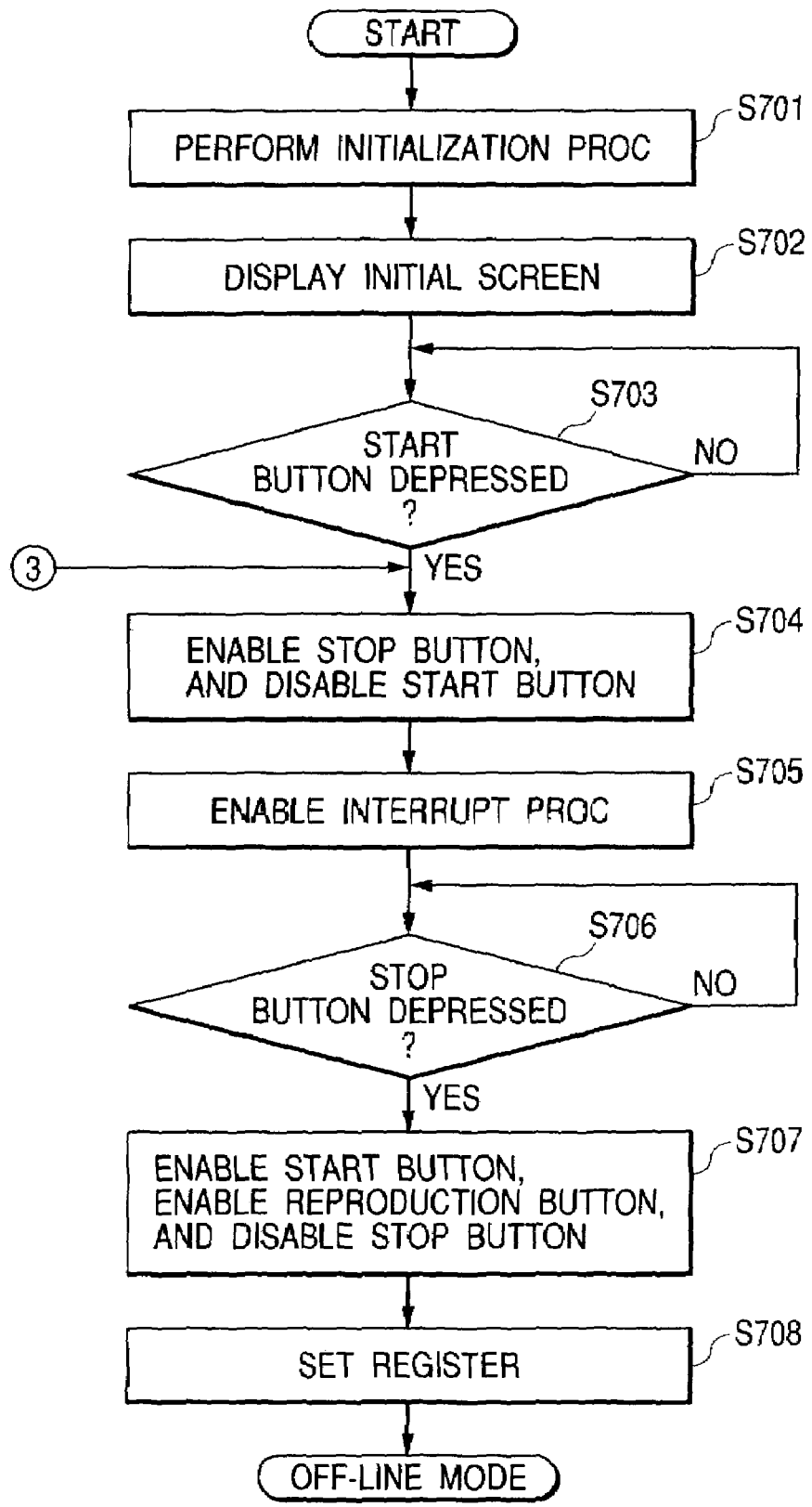
FIG. 7 is a flow chart showing operations of programs executed by the printer emulator shown in FIG. 1.

FIG. 7 is a flow chart showing a series of operations to be performed by the printer emulator 23 shown in FIG. 1. All the software shown in this flow chart operates on the general-purpose computer 24 of the printer emulator 23. The software provides a GUI (Graphical User Interface) for the user and participates in the control or the like of the interface unit 22.

In FIG. 7, when the software is activated on the general-purpose computer 24 of the printer emulator 23, an initialization process is executed (step S701). In this initialization process, an initialization process of parameters or the like regarding the software is executed. Further, an initialization process of the hardware such as setting of the register regarding the video data control unit 200 is executed. Subsequently, an initial screen shown in FIG. 11 described in the following is displayed by the CRT 25 of the printer emulator 23 (step S702).

Figure 11:
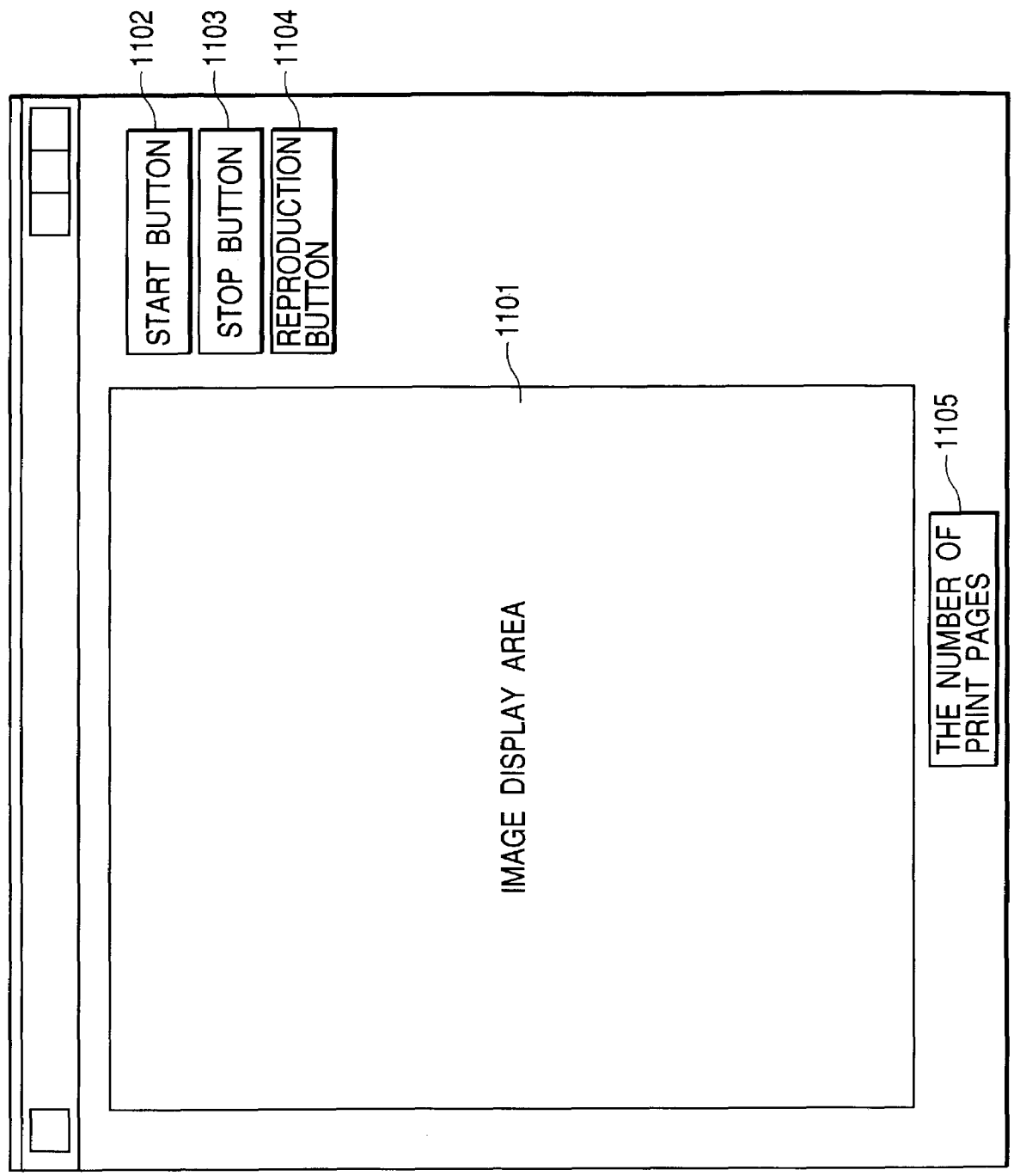
FIG. 11 is a view showing an initial screen on a CRT of the printer emulator shown in FIG. 1.

FIG. 11 is a view for explaining the initial screen on the CRT 25 to be displayed in the step S702 in FIG. 7. In FIG. 11, numeral 1101 denotes an image display area, where the image data generated by the printer controller 21 is displayed by the reduced size. Numeral 1102 denotes a start button, numeral 1103 denotes a stop button and numeral 1104 denotes a reproduction button. After activating the software, when the initial careen is displayed in the step S702 in FIG. 7, only the start button 1102 is enabled. Numeral 1105 denotes a display unit of the number of print pages for displaying a counted value of the number of pages to which a print process was executed.

Return to FIG. 7, it is then discriminated whether or not the depression of the start button 1102 on the screen in FIG. 11 is detected (step S703). In case of detecting the depression of the start button 1102, a flow advances to a step S704. That is, the start button 1102 is disabled and the stop button 1103 is enabled (step S704). Further, a start of an image data capturing operation is set for the video data control unit 200 through the manager 63 (software of manager layer), a process start register of the video data control unit 200 is set and a page end interrupt process is enabled (step S705).

When the page end interrupt process is enabled, the software functions to wait for the interrupt process until the stop button 1103 is depressed (YES in step S706). When the depression of the stop button 1103 is detected in the step S706, the start button 1102 is enabled, the reproduction button 1104 is enabled and the stop button 1103 is disabled (step S707). Next, after setting the register of the video data control unit 200 (step S708), the process subsequently shifts to an off-line mode process shown in FIGS. 9 and 10.

Figure 8:
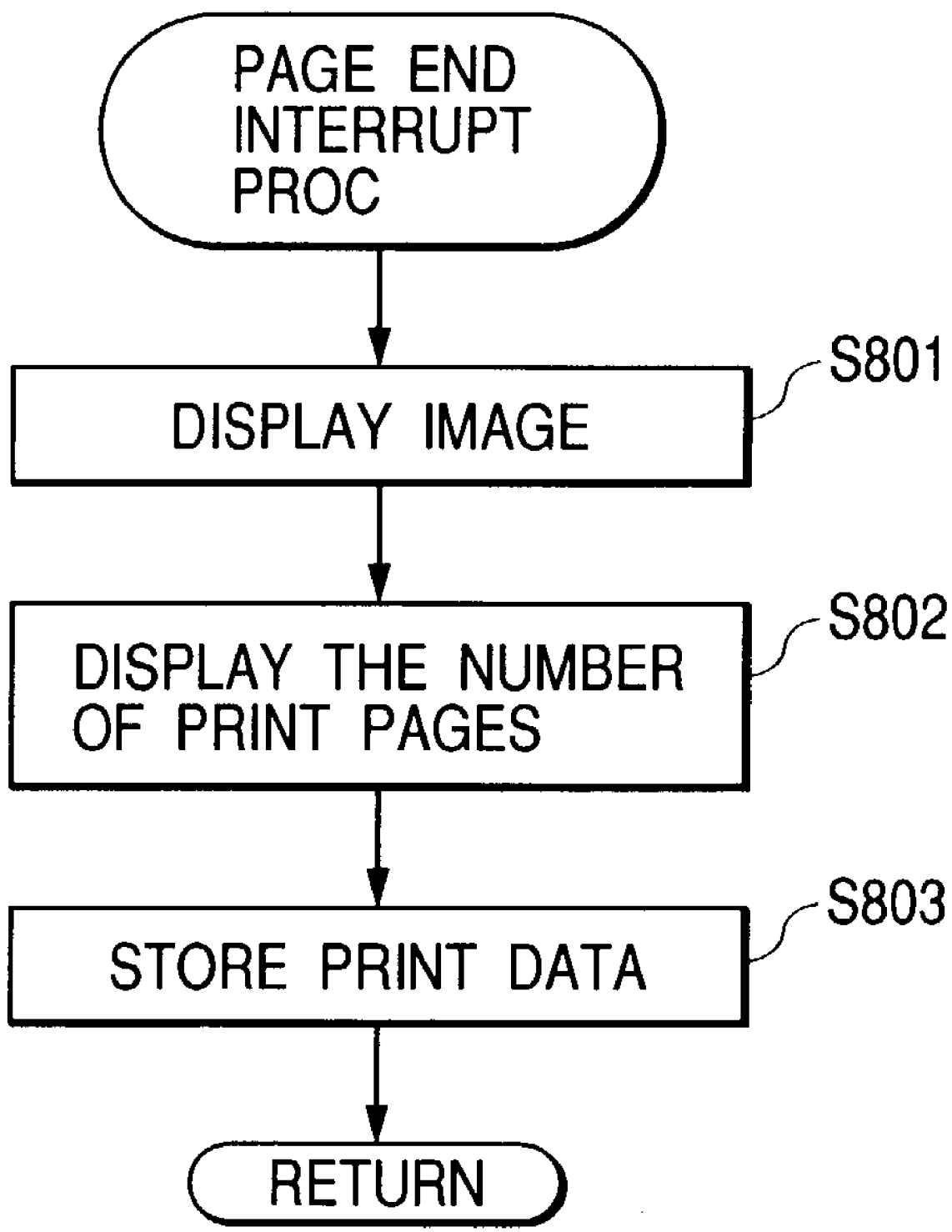
FIG. 8 is a flow chart showing a page end interrupt process executed in the printer emulator shown in FIG. 1.

FIG. 8 is a flow chart showing the page end interrupt process enabled in the step S705 in FIG. 7. In FIG. 8, when it is detected that the one page image data is transferred to a predetermined memory by the interface unit 22 of the printer emulator 23 on the basis of the occurrence of the page end interrupt, the software functioning on the general-purpose computer 24 firstly functions to display the image data in the image display area 1101 on the CRT 25 shown FIG. 11 (step S801), and a display of the display unit of the number of print pages 1105 is updated (step S802). Subsequently, a flow advances to a step S803, where the image data is stored in the storage 26 of the general-purpose computer 24 with a predetermined format and then the process is terminated (step S803).

As above, in accordance with occurrence of the page end interrupt, it becomes possible to display the image data to be rasterized of the printer controller 21 on the CRT 25 of the printer emulator 23 in real time similar to a case of outputting the image on a paper in a case where the printer engine is connected to the print controller 21. At the same time, since the image data are sequentially stored in the storage 26 of the general-purpose computer 24, the stored data can be read again and utilized.

Figure 9:
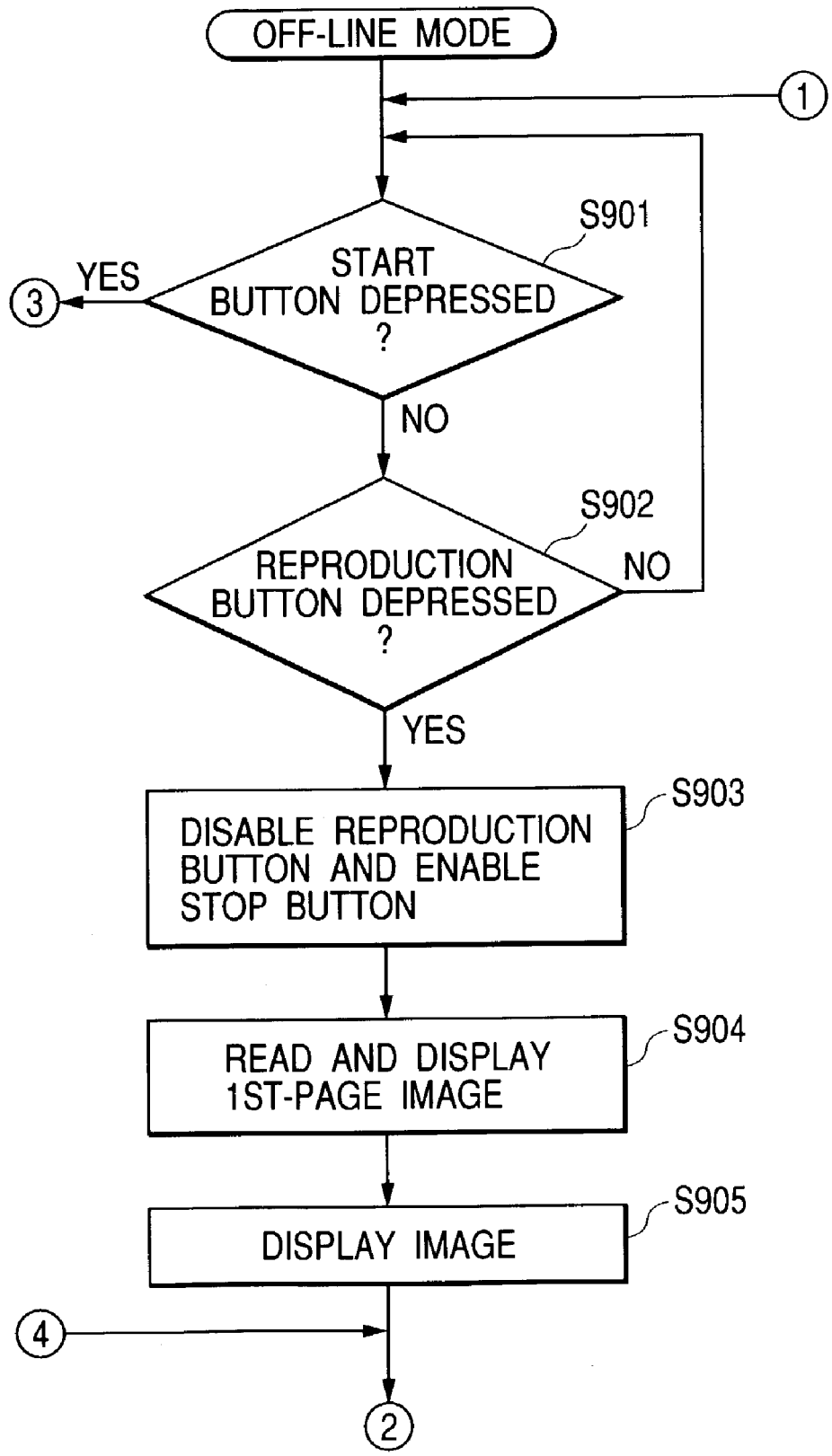
FIG. 9 is a flow chart showing an operation of an off-line mode performed in the printer emulator shown in FIG. 1.
Figure 10:
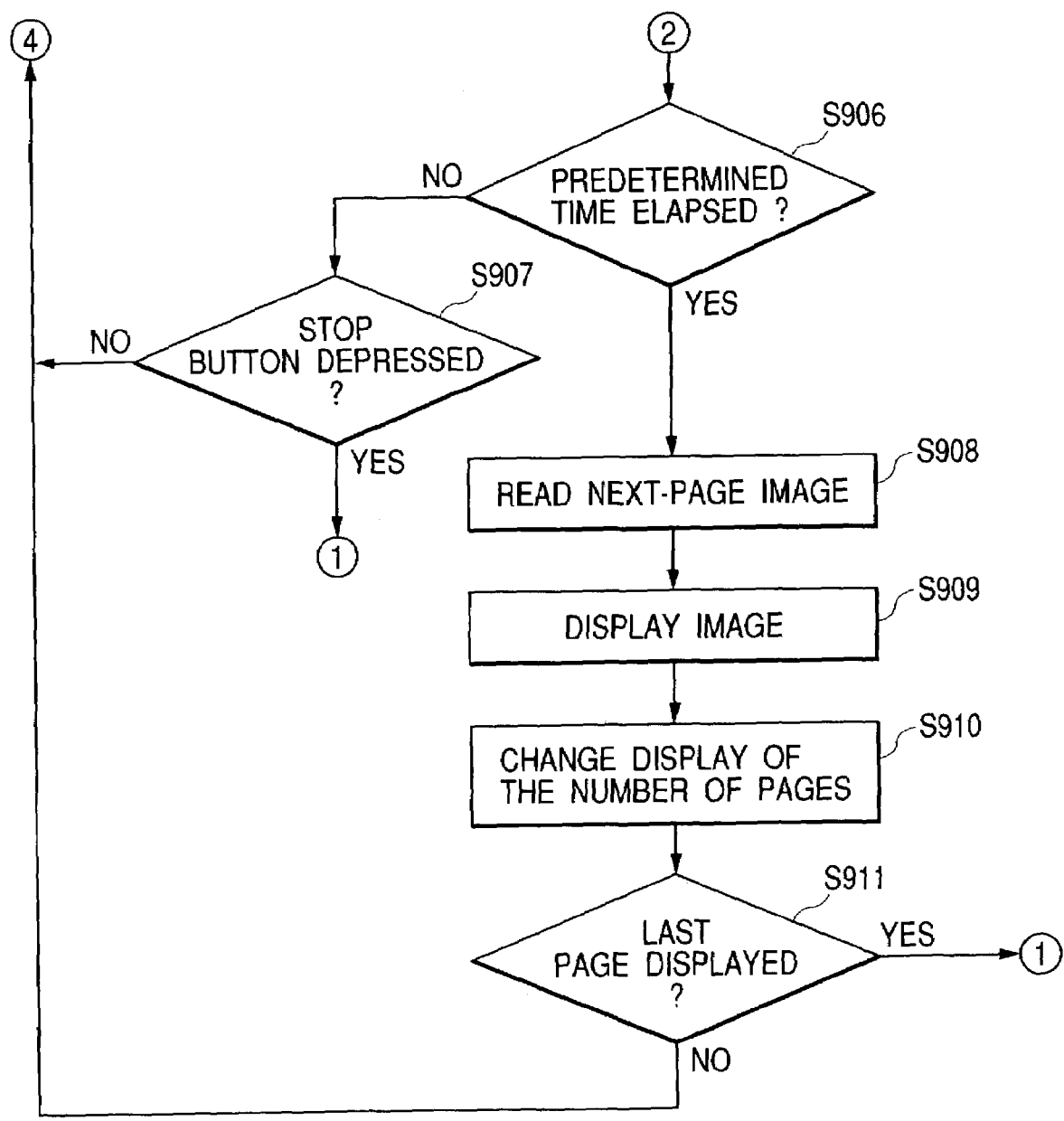
FIG. 10 is a flow chart showing the operation of the off-line mode performed in the printer emulator shown in FIG. 1.

FIGS. 9 and 10 are flow charts showing operations of the off-line mode shifted on the basis of the detection of depression of the stop button 1103 on the screen shown in FIG. 11 in the step S706 in FIG. 7. Upon shifting to the off-line mode, as shown in the step S707 in FIG. 7, the start button 1102 and the reproduction button 1104 on the screen in FIG. 11 are enabled. In FIGS. 9 and 10, it is judged whether or not the start button 1102 is depressed (step S901). When the depression of the start button 1102 is detected, the flow returns to the step S704 in FIG. 7 again, and an emulation operation is performed. While, when the depression of the start button 1102 is not detected, it is judged whether or not the reproduction button 1104 is depressed (step S902).

If the depression of the reproduction button 1104 is not detected, a flow returns to the step S901 again. While, when the depression of the reproduction button 1104 is detected, the start button 1102 and the reproduction button 1104 are disabled, and the stop button 1103 is enabled (step S903).

Thereafter, first page image data is read from the image data which were stored, in the step S803 in FIG. 8 (step S904), and that image data is displayed on the CRT 25 (step S905). Next, it is judged whether or not a predetermined time is elapsed (step S906). When the predetermined time is elapsed, the flow advances to a step S907. It should be noted that the predetermined time is a display interval of the image data to be sequentially displayed on the CRT 25, and this predetermined time can be arbitrarily set.

When the predetermined time is elapsed in the step S906, next-page image data stored in the storage 26 in the general-purpose computer 24 is read (step S908), and the image is displayed on the CRT 25 (step S909). Thereafter, a display of the display unit of the number of print pages displayed on the screen of the CRT shown in FIG. 11 is updated (step S910). Next, it is judged whether or not an image displayed on the CRT 25 is a last page (step S911). If it is the last page, the flow returns to the step S901 again, and the process is continuously executed. If it is not the last page, the flow returns to the step S906, and the process is continuously executed.

Moreover, when the predetermined time is not elapsed in the step S906, it is detected whether or not the stop button 1103 on the screen shown in FIG. 11 is depressed (step S907). If the depression of the stop button 1103 is detected, the flow returns to the step S901 again, and the process is continuously executed. If the depression of the stop button 1103 is not detected, the flow returns to the step S906, and the process is continuously executed.

As above, in the printer emulator, in case of the off-line mode, images can be sequentially displayed on the CRT 25 by sequentially switching pages with a predetermined interval, and it is possible to stop displaying at an arbitrarily page.

As explained above, according to the embodiment of the present invention, in case of developing the image output apparatus composed of the controller unit (printer controller 100) for generating the image data and the engine unit for forming the image on the medium on the basis of the image data, when the controller unit operation verification apparatus (printer emulator 23) according to the present invention is used instead of the engine unit, the halftone image data before being converted into the PWM signal, which is different from the PWM signal to be output to the engine unit, is converted into the serial signal by the parallel/serial conversion unit 104 of the printer controller 100 and then the converted serial signal is output. Accordingly, it becomes possible to transfer the multivalued halftone data, which does not include difference due to the conversion process, to the controller unit operation verification apparatus without adding the exclusive signal line used for transferring the multivalued halftone data and the driver circuit. As a result, an effect of improving the developing efficiency of the image output apparatus according to accurate verification of the output image data is obtained.

Other Embodiment

In the above embodiment, as an operating system to be installed in a printer emulator, a case of utilizing the Windows™ 2000 of Microsoft Corporation has been explained. However, the present invention is not limited to this case, but can be structured on systems of various environments.

In the above embodiment, a case of structuring the printer emulator (printer controller operation verification system) by the combination with a personal computer has been explained. However, the present invention is not limited to this case, but may be realized by the combination with various other equipments.

In the above embodiment, a case of verifying an operation of a printer controller to be mounted on a printer having an image forming function has been explained. However, the present invention is not limited to this case, but may be applied to a case of verifying an operation of a printer controller to be mounted on a copying machine having an image reading function and an image forming function or a case of verifying an operation of a printer controller to be mounted on a multifunctional machine having plural functions such as an image reading function, an image forming function, a facsimile function and the like.

An object of the present invention can be achieved in a case where a storage medium storing the program codes of software for realizing the functions of the above embodiment is supplied to a system or an apparatus and then a computer (or CPU or MPU) in the system or the apparatus reads and executes the program codes stored in the storage medium. In this case, the program codes themselves read from the storage medium realize the functions of the present embodiments, and the storage medium storing such the program codes constitute the present invention.

The storage medium for supplying the program codes can be, for example, a floppy (registered trademark) disk, a hard disk, an optical disk, a magnetooptical disk, a CD-ROM, a CD-R, a magnetic tape, a non-volatile memory card, a ROM or the like.

The present invention includes not only a case where the functions of the above embodiment are realized by the execution of the program codes read by the computer, but also a case where an OS (operating system) or the like functioning on the computer executes all the process or a part thereof according to the instructions of the program codes, thereby realizing the functions of the above embodiment.

Further, the present invention includes a case where the program codes read from the storage medium are once written in a memory provided in a function expansion board inserted in the computer or a function expansion unit connected to the computer, then a CPU or the like provided in the function expansion board or the function expansion unit executes all the process or a part thereof according to the instructions of such the program codes, thereby realizing the functions of the above embodiment.

Moreover, the program codes at this time may be MPU native codes, codes described with predetermined interpreter language and to be converted into the MPU native codes when it is a run time and codes which are script data described with a predetermined format and can be interpreted by an operating system or the like for the execution.

The present invention can be applied to a system constituted by a plurality of devices, or to an apparatus comprising a single device. Furthermore, it goes without saying that the invention is applicable also to a case where the object of the invention is attained by supplying a program to a system or apparatus.

As many apparently widely different embodiments of the present invention can be made without departing from the spirit and scope thereof, it is to be understood that the invention is not limited to the specific embodiments thereof expect as defined in the appended claims.

What is claimed is:

1. A controller operation verification system which consists of a controller for generating image data and a controller operation verification apparatus which verifies an operation of said controller, wherein
said controller comprises:
first conversion means for converting input image data into an output image signal;
second conversion means for converting the input image data into a serial signal; and output signal selection means for selecting the output signal of either said first conversion means or said second conversion means, and outputting the selected output signal, and said controller operation verification apparatus comprises:
data restoration means for restoring the output signal output from said second conversion means and selected by said output signal selection means to the input image data.

2. A controller operation verification system according to claim 1, wherein said controller includes data obtaining means for obtaining data through external interface means, discrimination means for discriminating a kind of connected-destination apparatus for said controller on the basis of the data obtained by said data obtaining means, and control means for controlling said output signal selection means on the basis of a discriminated result by said discrimination means.

3. A controller operation verification system according to claim 2, wherein said connected-destination apparatus is either an engine unit of an image output apparatus or said controller operation verification apparatus.

4. A controller operation verification system according to claim 3, wherein said image output apparatus includes a printer having an image forming function, a copying machine having an image reading function and the image forming function, and a multifunctional machine having plural functions such as the image reading function, the image forming function, a facsimile function and the like.

5. A controller operation verification system according to claim 1, wherein said controller for generating the image data constitutes an image output apparatus in cooperation with an engine unit for forming an image on a medium on the basis of the image data.

6. A controller operation verification system according to claim 1, wherein said first conversion means is means for converting the input image data into a pulse-width modulation signal.

7. A controller operation verification system according to claim 1, further comprising means for converting the input image data into halftone digital image data, wherein said output signal selection means selects the output signal of any one of said conversion means and outputs the selected output signal.

8. An image processing apparatus which generates image data and can be connected with a controller operation verification apparatus, comprising:
first conversion means for converting input image data into an output image signal;
second conversion means for converting the input image data into a serial signal;
output signal selection means for selecting the output signal of either said first conversion means or said second conversion means, and outputting the selected output signal; and
data restoration means for restoring the output signal output from said second conversion means and selected by said output signal selection means to the input image data.

9. An image data output control method which is applied to an image processing apparatus for generating image data and capable of being connected with a controller operation verification apparatus, said method comprising:
a first conversion step of converting input image data into an output image signal;
a second conversion step of converting the input image data into a serial signal;
an output signal selection step of selecting the output signal in either said first conversion step or said second conversion step, and outputting the selected output signal; and
a data restoration step of restoring the output signal output in said second conversion step and selected in said output signal selection step to the input image data.

10. A computer-readable storage medium which stores a program for executing an image data output control method which is applied to an image processing apparatus for generating image data and capable of being connected with a controller operation verification apparatus, said image data output control method comprising:
a first conversion step of converting input image data into an output image signal;
a second conversion step of converting the input image data into a serial signal; and
an output signal selection step of selecting the output signal in either said first conversion step or said second conversion step, and outputting the selected output signal,
wherein the controller operation verification apparatus executes a data restoration step of restoring the output signal output in said second conversion step and selected in said output signal selection step to be executed in the image processing apparatus, to the input image data.

11. A control method for controlling a controller operation verification system which consists of a controller operation method for generating image data and a controller operation verification method which verifies an operation of said controller, wherein
said controller operation method comprises:
a first conversion step of converting input image data into an output image signal;
a second conversion step of converting the input image data into a serial signal; and
an output signal selection step of selecting the output signal of either said first conversion step or said second conversion step, and outputting the selected output signal, and
said controller operation verification method comprises:
a data restoration step of restoring the output signal output from said second conversion step and selected by said output signal selection step to the input image data.

12. A computer-executable program stored on a computer-readable medium for controlling a controller operation verification system which consists of a controller operation method for generating image data and a controller operation verification method which verifies an operation of said controller operation method, wherein
said controller operation method comprises:
a first conversion step of converting input image data into an output image signal;
a second conversion step of converting the input image data into a serial signal; and
an output signal selection step of selecting the output signal of either said first conversion step or said second conversion step, and outputting the selected output signal, and
said controller operation verification method comprises:
a data restoration step of restoring the output signal output from said second conversion step and selected by said output signal selection step to the input image data.

* * * * *